(12) United States Patent
Matsumoto et al.

(10) Patent No.: US 11,910,747 B2
(45) Date of Patent: Feb. 27, 2024

(54) ELECTRIC WORK MACHINE WITH COOLING AIR VENTILATION

(71) Applicant: HONDA MOTOR CO., LTD., Tokyo (JP)

(72) Inventors: Takuya Matsumoto, Wako (JP); Makoto Uchimi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 593 days.

(21) Appl. No.: 16/929,613

(22) Filed: Jul. 15, 2020

(65) Prior Publication Data

US 2021/0037707 A1 Feb. 11, 2021

(30) Foreign Application Priority Data

Aug. 7, 2019 (JP) .................................. 2019-145083

(51) Int. Cl.
*A01D 34/78* (2006.01)
*A01D 34/81* (2006.01)
(Continued)

(52) U.S. Cl.
CPC ............. *A01D 34/78* (2013.01); *A01D 34/81* (2013.01); *A01D 34/006* (2013.01); *A01D 34/69* (2013.01);
(Continued)

(58) Field of Classification Search
CPC ........ A01D 34/78; A01D 34/81; A01D 34/69; A01D 34/828; A01D 69/02
See application file for complete search history.

(56) References Cited

U.S. PATENT DOCUMENTS 5,894,715 A * 4/1999 Braun .................... A01D 34/74
56/320.1
6,666,008 B2 * 12/2003 Iida ........................ A01D 69/02
56/11.9
(Continued)

FOREIGN PATENT DOCUMENTS

CN 203792295 U * 8/2014 ............. B25D 17/20
EP 2656719 A1 * 10/2013 ........... A01D 34/008
(Continued)

OTHER PUBLICATIONS

German Office Action dated Jun. 26, 2023 issued in corresponding German application No. 10 2020 208 576.5; English translation included (10 pages).
(Continued)

*Primary Examiner* — Alicia Torres
(74) *Attorney, Agent, or Firm* — Rankin, Hill & Clark LLP (57) ABSTRACT

A work machine includes a housing, a motor positioned on an upper surface of the housing, a battery connected with the motor, and a blade to be driven by the motor. An air introduction member that cools a control device by causing air to flow is provided on an inside of a motor case. Plural bottom surface ventilation ports and plural side surface ventilation ports are provided in the motor case. Both of the ventilation ports cause air to flow into the inside of the motor case. The plural bottom surface ventilation ports and the plural side surface ventilation ports are disposed at positions lower than the air introduction member and the control device.

7 Claims, 9 Drawing Sheets

(51) Int. Cl.
*A01D 101/00* (2006.01)
*A01D 34/69* (2006.01)
*A01D 34/00* (2006.01)

(52) U.S. Cl.
CPC ....... *A01D 2101/00* (2013.01); *B60L 2200/40* (2013.01)

(56) References Cited

U.S. PATENT DOCUMENTS

| | | | |
|---|---|---|---|
| 8,127,876 B2* | 3/2012 | Phillips | H01M 10/6563 180/68.5 |
| 8,429,885 B2* | 4/2013 | Rosa | A01D 34/824 56/11.9 |
| 9,093,868 B2* | 7/2015 | Baxter | A01D 34/008 |
| 10,721,863 B2* | 7/2020 | Uchimi | A01D 34/78 |
| 2020/0177052 A1 | 6/2020 | Fujiwara | |
| 2020/0196522 A1* | 6/2020 | Feng | A01D 34/78 |
| 2020/0315090 A1* | 10/2020 | Hasegawa | A01D 34/78 |

FOREIGN PATENT DOCUMENTS

| | | | | |
|---|---|---|---|---|
| EP | 2875711 A1 * | 5/2015 | | A01D 34/78 |
| JP | 2003-061439 | 3/2003 | | |
| WO | 2019/058439 A1 | 3/2019 | | |

OTHER PUBLICATIONS

German Search Report dated Jun. 26, 2023 issued in corresponding German application No. 10 2020 208 576.5; English translation included (12 pages).

* cited by examiner

ELECTRIC WORK MACHINE WITH COOLING AIR VENTILATION

INCORPORATION BY REFERENCE

The present application claims priority under 35 U.S.C. § 119 to Japanese Patent Application No. 2019-145083 filed on Aug. 7, 2019. The content of the application is incorporated herein by reference in its entirety.

BACKGROUND OF THE INVENTION

Field of the Invention

The present invention relates to a work machine.

Description of the Related Art

In related art, a walking work machine has been known which rotates a blade arranged below a housing by a motor connected with a battery and thereby cuts lawn grass. Such a work machine is provided with a cover that covers a battery, a motor, and an electric control unit performing control or the like of the motor. Such a work machine has been known in which cooling air is caused to flow through an inside of a cover and members housed on the inside of the cover are cooled (for example, see Japanese Laid-open No. 2003-61439).

SUMMARY OF THE INVENTION

However, in a configuration in related art, because a cover is provided with an air inlet port for cooling air which communicates with an outside, there has been a concern that a foreign object such as dust or trash enters a motor from the outside.

An object of one aspect of the present invention is to provide a work machine in which a foreign object can be inhibited from entering a motor.

One aspect of the present invention provides a work machine including: a housing; a motor positioned on an upper surface of the housing; a battery connected with the motor; a working unit to be driven by the motor; and a case covering the motor, in which an air introduction member that cools a control device by causing air to flow is provided on an inside of the case, a ventilation port that causes air to flow into the inside of the case is provided to the case, and the ventilation port is provided in a position lower than the air introduction member and the control device.

In one aspect of the present invention, in the work machine, a partition plate is provided to the air introduction member, a suction port that sucks air flowing into the inside of the case is provided above the partition plate, and an exhaust port that exhausts air drawn in by a cooling fan is provided below the partition plate.

In one aspect of the present invention, in the work machine, the exhaust port is provided in a position higher than the working unit.

In one aspect of the present invention, in the work machine, the control device is placed on the air introduction member, the air introduction member is provided above the motor, a cooling fan that draws air into the air introduction member is provided between the motor and the air introduction member, and the cooling fan demarcates an upper surface of the motor.

In one aspect of the present invention, in the work machine, a vane arranged on a side of the motor and a vane arranged on a side of the air introduction member are provided to the cooling fan.

In one aspect of the present invention, in the work machine, the battery is fixed to the upper surface of the housing via the case covering the motor, and the ventilation port is provided below the battery.

In one aspect of the present invention, in the work machine, an air path through which air flowing into the inside of the case flows is provided below the ventilation port.

In one aspect of the present invention, in the work machine, the working unit is a blade that mows lawn grass below the housing.

One aspect of the present invention may inhibit a foreign object from entering a motor.

DETAILED DESCRIPTION OF THE PREFERRED EMBODIMENT

An embodiment of the present invention will hereinafter be described with reference to drawings. In this embodiment, a lawn mower will be described as an example of a work machine.

Note that in the description, as for descriptions of front, rear, left, right, up, and down, the forward travel direction of the work machine is defined as the front of a vehicle unless otherwise mentioned. A reference character FR indicated in each of drawings denotes the front of the vehicle, a reference character UP denotes the upper side of the vehicle, and a reference character LH denotes the left of the vehicle.

Figure 1:
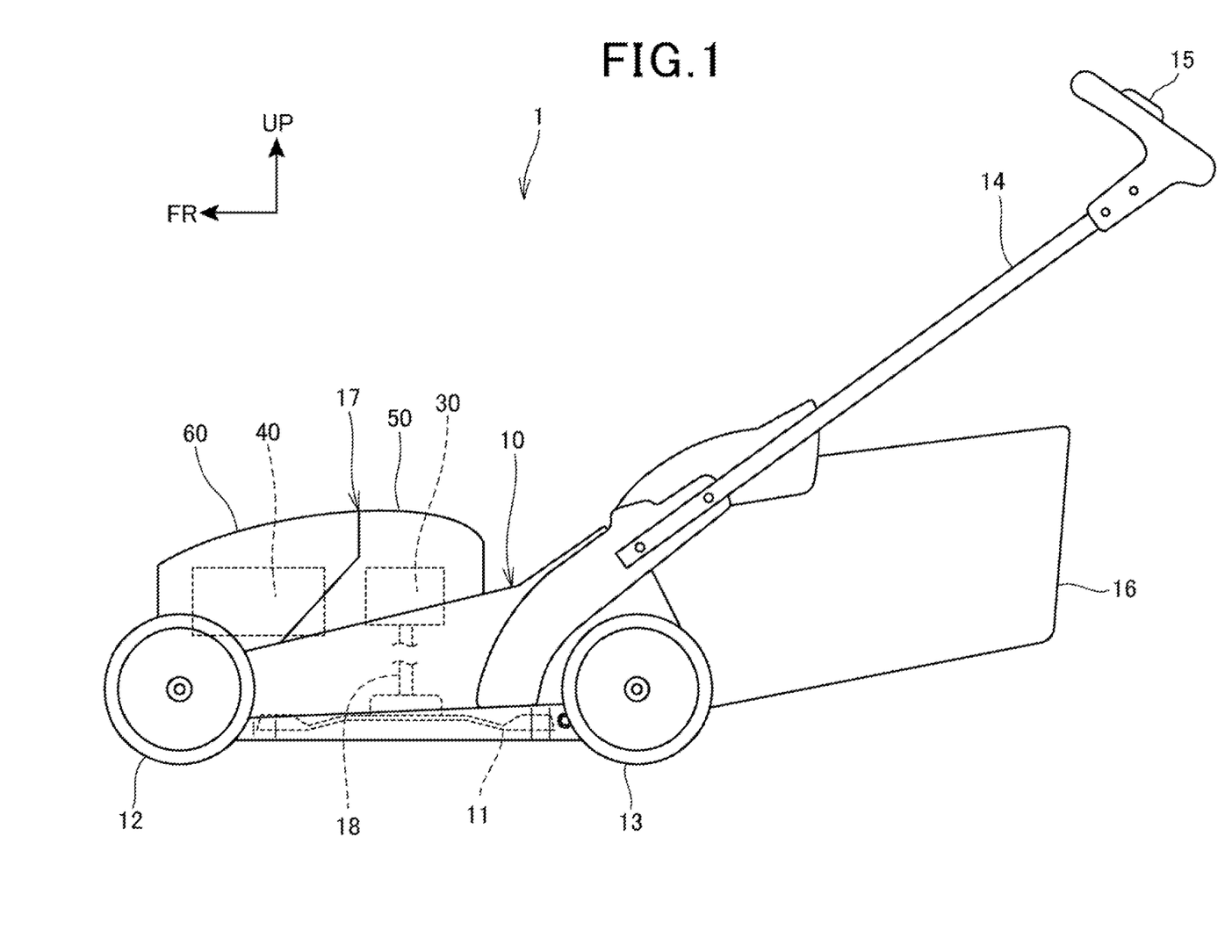
FIG. 1 is a side view that illustrates an outline configuration of a work machine according to an embodiment of the present invention.

FIG. 1 is a side view that illustrates an outline configuration of a work machine 1 according to the embodiment of the present invention.

The work machine 1 of this embodiment is a walking lawn mower that moves by being pushed by a worker performing lawn mowing work.

The work machine 1 includes a housing 10 as a main body. The housing 10 is a member that houses a blade 11 as a working unit of the work machine 1 on an inside, and in the housing 10, a lower surface facing a lawn ground is open.

A pair of left and right front wheels 12 are provided in a front portion of the housing 10, and a pair of left and right rear wheels 13 are provided in a rear portion of the housing 10. An operation handle 14 extending rear-upward is provided in a rear portion of the housing 10. An operation unit 15 by which the worker operates rotation, stop, the number of rotations, and so forth of the blade 11 is provided in an upper end portion of the operation handle 14.

Figure 2:
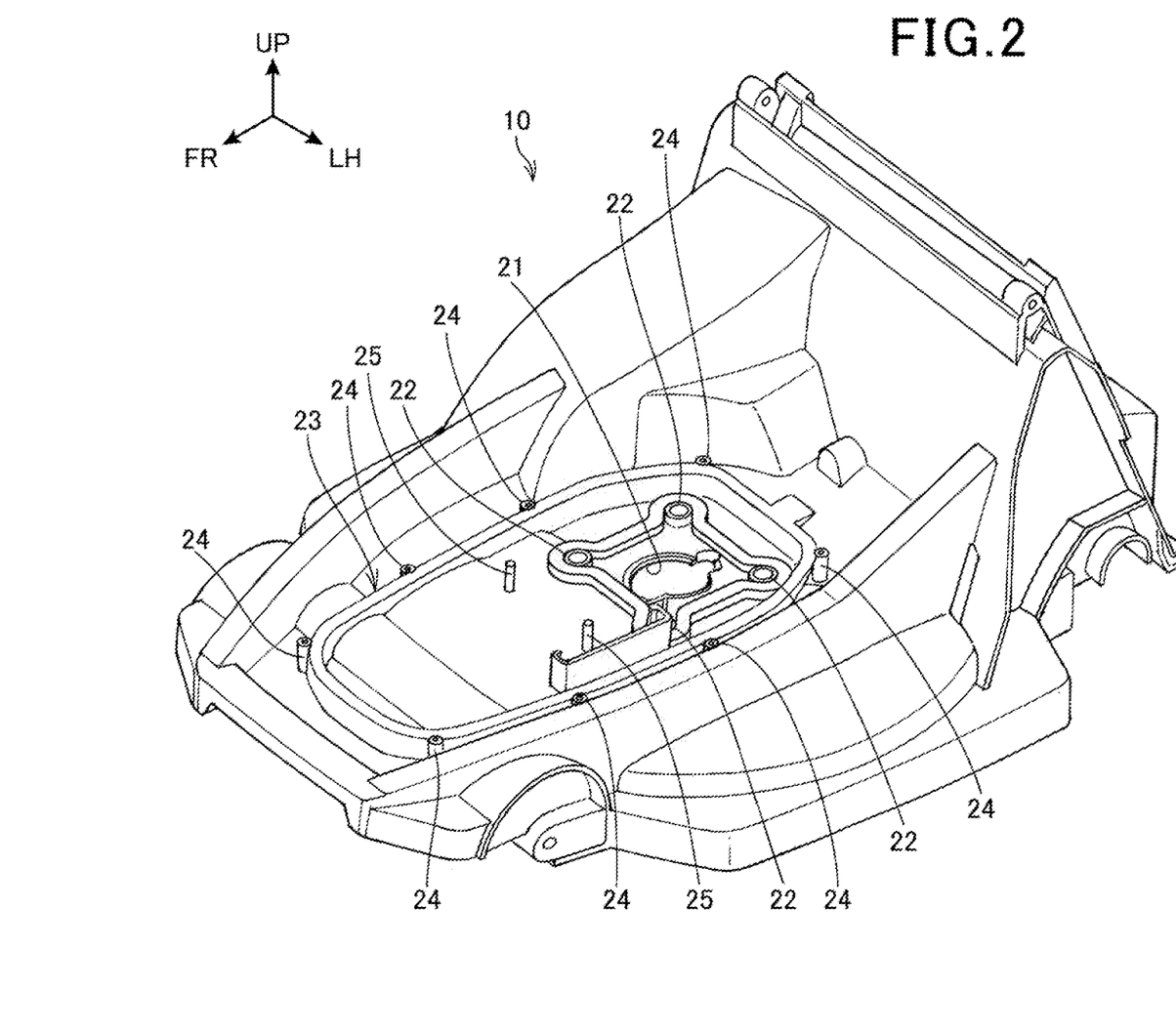
FIG. 2 is a perspective view of a housing.

FIG. 2 is a perspective view of the housing 10.

As illustrated in FIG. 2, an insert-through hole 21 for causing an upper surface to communicate with the lower surface is provided at a center of the housing 10, and plural motor fixing portions 22 formed to protrude upward from the upper surface of the housing 10 are provided around the insert-through hole 21.

A first case fixing portion 23 is provided on the upper surface of the housing 10. The first case fixing portion 23 is formed to protrude upward from the upper surface of the housing 10 to a predetermined height, and the first case fixing portion 23 is formed in an annular shape that surrounds the insert-through hole 21 and each of the motor fixing portions 22 on the upper surface of the housing 10. That is, a front end side of the first case fixing portion 23 in the front-rear direction of the housing 10 is arranged between the pair of front wheels 12, and a rear end side is arranged in the rear of each of the motor fixing portions 22.

In the first case fixing portion 23, case fastening portions 24 into which screw members 94 can be threaded are provided at predetermined intervals in the circumferential direction of the first case fixing portion 23.

On the upper surface of the housing 10, a pair of second case fixing portions 25 are provided to protrude in a range surrounded by the first case fixing portion 23 and in parts positioned on a front side of the motor fixing portions 22.

Figure 3:
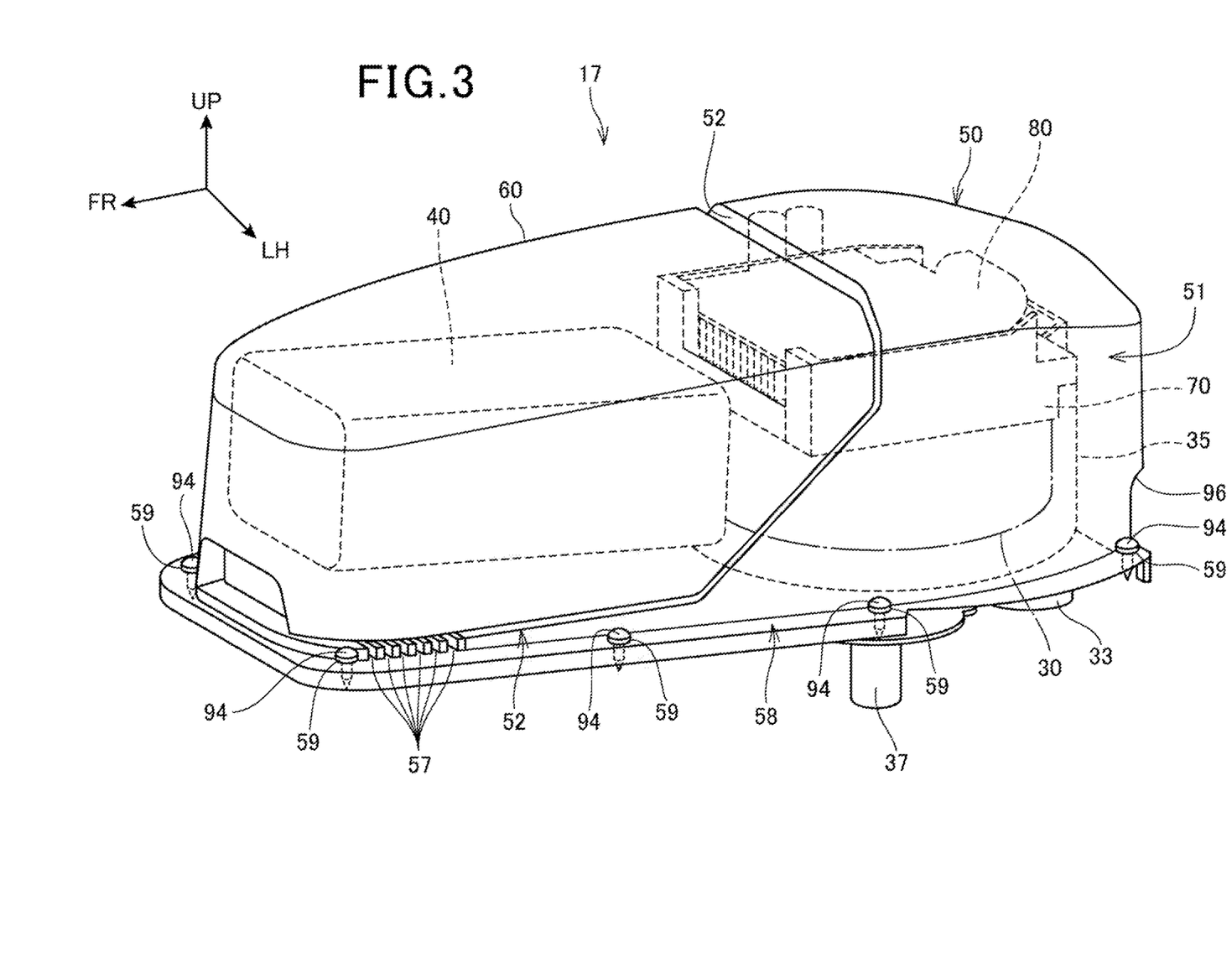
FIG. 3 is a perspective view of a power unit as seen from a lateral side.
Figure 4:
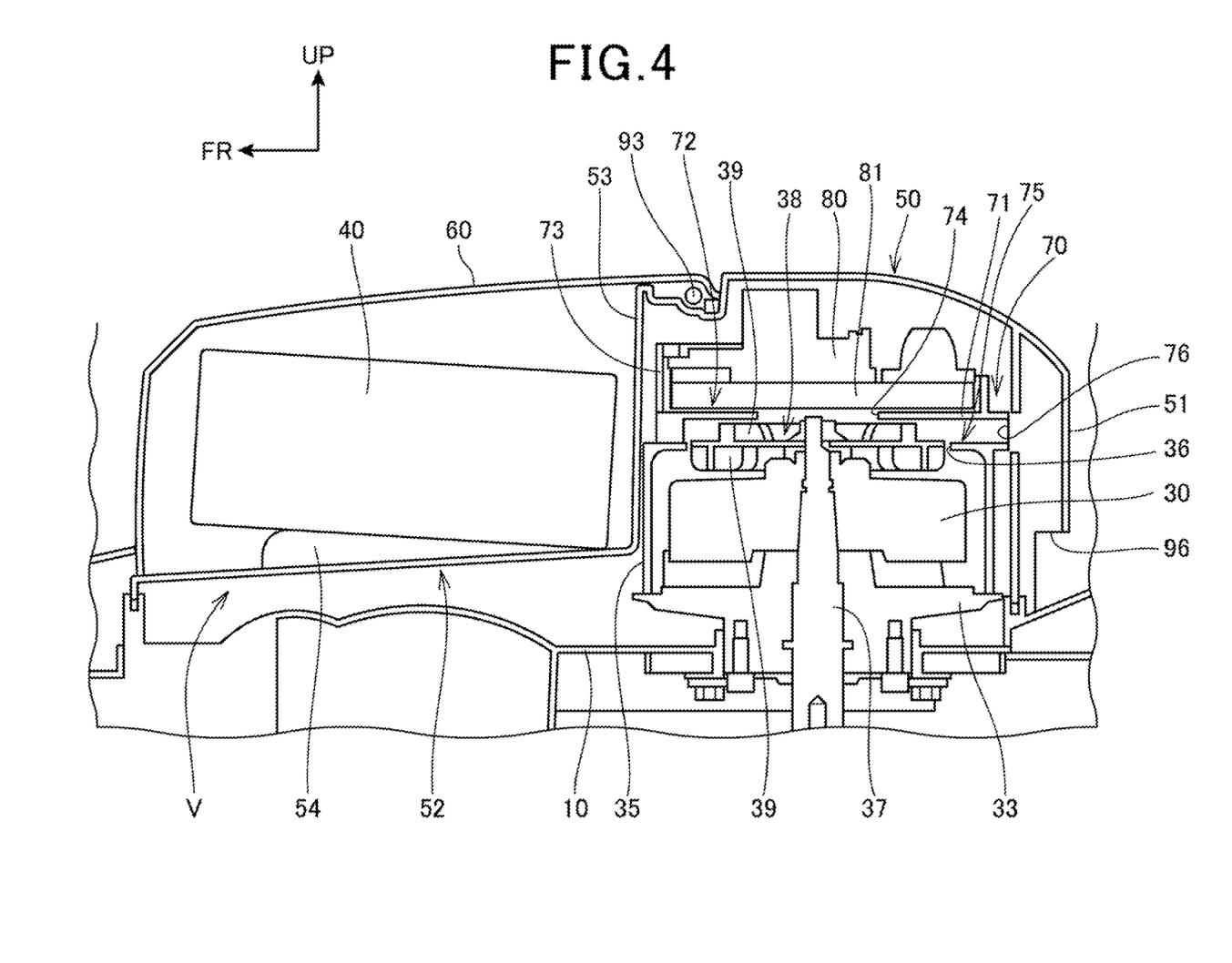
FIG. 4 is a vertical cross-sectional view in a longitudinal direction, which illustrates an outline configuration of an inside of the power unit.
Figure 5:
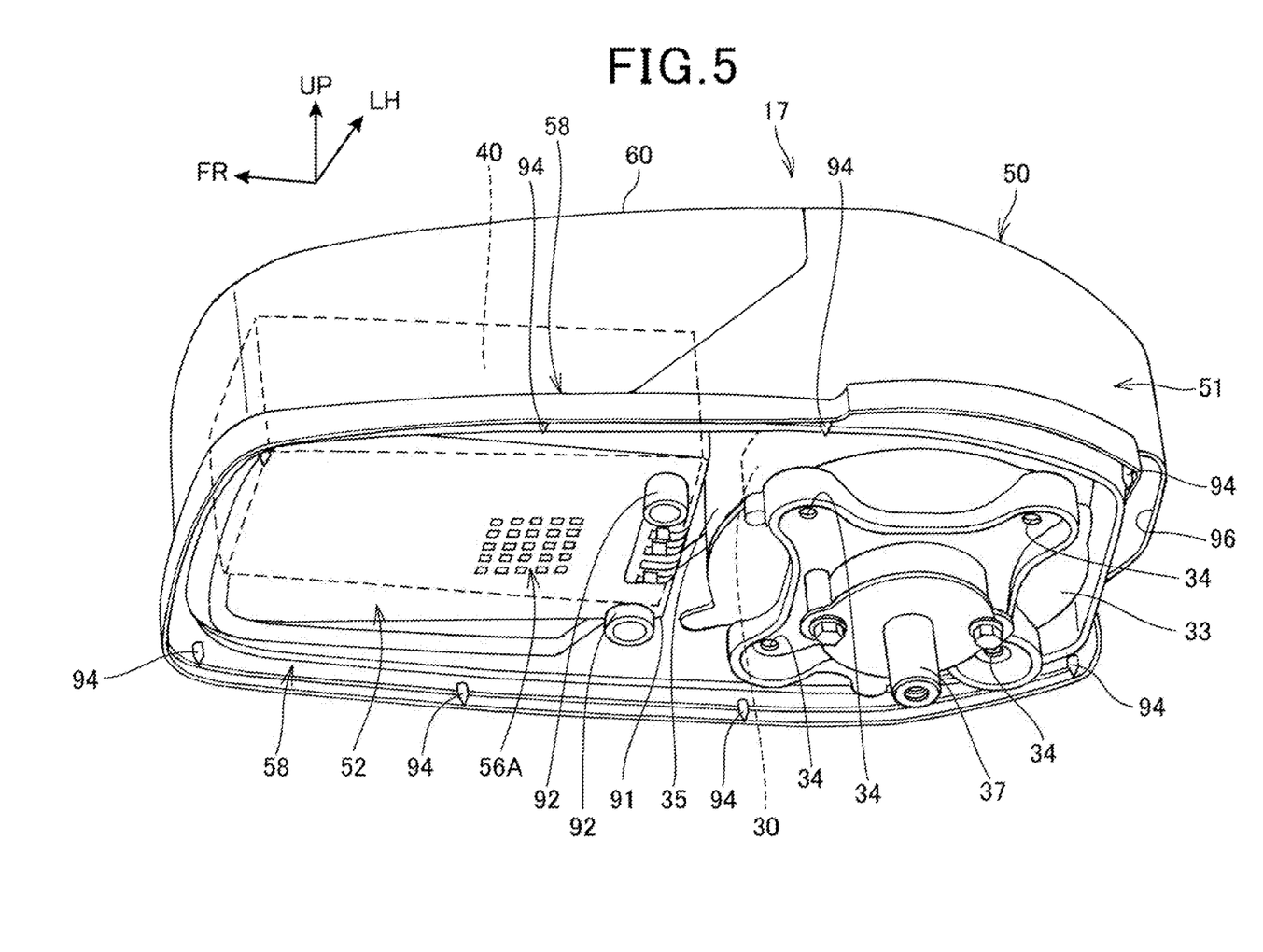
FIG. 5 is a perspective view of the power unit as seen from below.

FIG. 3 is a perspective view of a power unit 17, and FIG. 4 is a vertical cross-sectional view in the longitudinal direction, which illustrates an outline configuration of an inside of the power unit 17. FIG. 5 is a perspective view of the power unit 17 as seen from below.

The power unit 17 is arranged on the upper surface of the housing 10. As illustrated in FIG. 3 and FIG. 4, the power unit 17 is a unit that houses a motor 30 and a battery 40.

The motor 30 of this embodiment is a drive source for rotating the blade 11, and the motor 30 is driven by electric power supplied from the battery 40.

As illustrated in FIG. 5, the motor 30 is fixed to an upper surface of a motor retainment member 33. The motor retainment member 33 includes plural retainment holes 34, each of which passes through from the upper surface to a lower surface. The retainment holes 34 and the respective motor fixing portions 22 are fastened together by fastening members such as bolts in a state where the retainment holes 34 are arranged in the positions corresponding to the respective motor fixing portions 22, and the motor 30 and the motor retainment member 33 are thereby fixed to the housing 10.

A motor cover 35 that covers the motor 30 is provided in an outer periphery on the upper surface of the motor retainment member 33. As illustrated in FIG. 4, an opening 36 is provided in an upper surface of the motor cover 35.

Both ends of a driving shaft 37 of the motor 30 respectively protrude from an upper surface and a lower surface of the motor 30. A lower end side of the driving shaft 37 is inserted through the insert-through hole 21, and the blade 11 arranged on the lower surface of the housing 10 is attached to a lower end of the driving shaft 37. The rotation center of the blade 11 is the driving shaft 37. That is, the driving shaft 37 rotates by driving of the motor 30, and the blade 11 is thereby rotated and driven.

A cooling fan 38 is provided at an upper end of the driving shaft 37. The cooling fan 38 is formed into a disk shape and closes the opening 36 of the motor cover 35.

Note that if the cooling fan 38 demarcates the motor 30 from a space above the motor 30, the cooling fan 38 may be provided with a predetermined gap from the opening 36.

Plural vanes 39 are provided on upper and lower surfaces of the cooling fan 38. The cooling fan 38 rotates in response to rotation and driving of the motor 30, the vanes 39 provided on a lower surface side of the cooling fan 38 stir air on an inside of the motor cover 35, causes thermal diffusion, and thereby cools the motor 30.

The motor 30, the motor cover 35, and the cooling fan 38 are covered by a motor case 50. The motor case 50 of this embodiment is formed of a resin, and the motor case 50 includes an accommodation portion 51 that covers the motor 30 and a flat plate portion 52 on which the battery 40 is arranged.

A lower surface of the accommodation portion 51 is open, and the accommodation portion 51 covers the motor 30 placed on the upper surface of the housing 10, a control device 80, and an air introduction member 70. In a part positioned on a rear side of the accommodation portion 51 in the front-rear direction of the work machine 1, a discharge port 96 which opens downward is provided.

Figure 6:
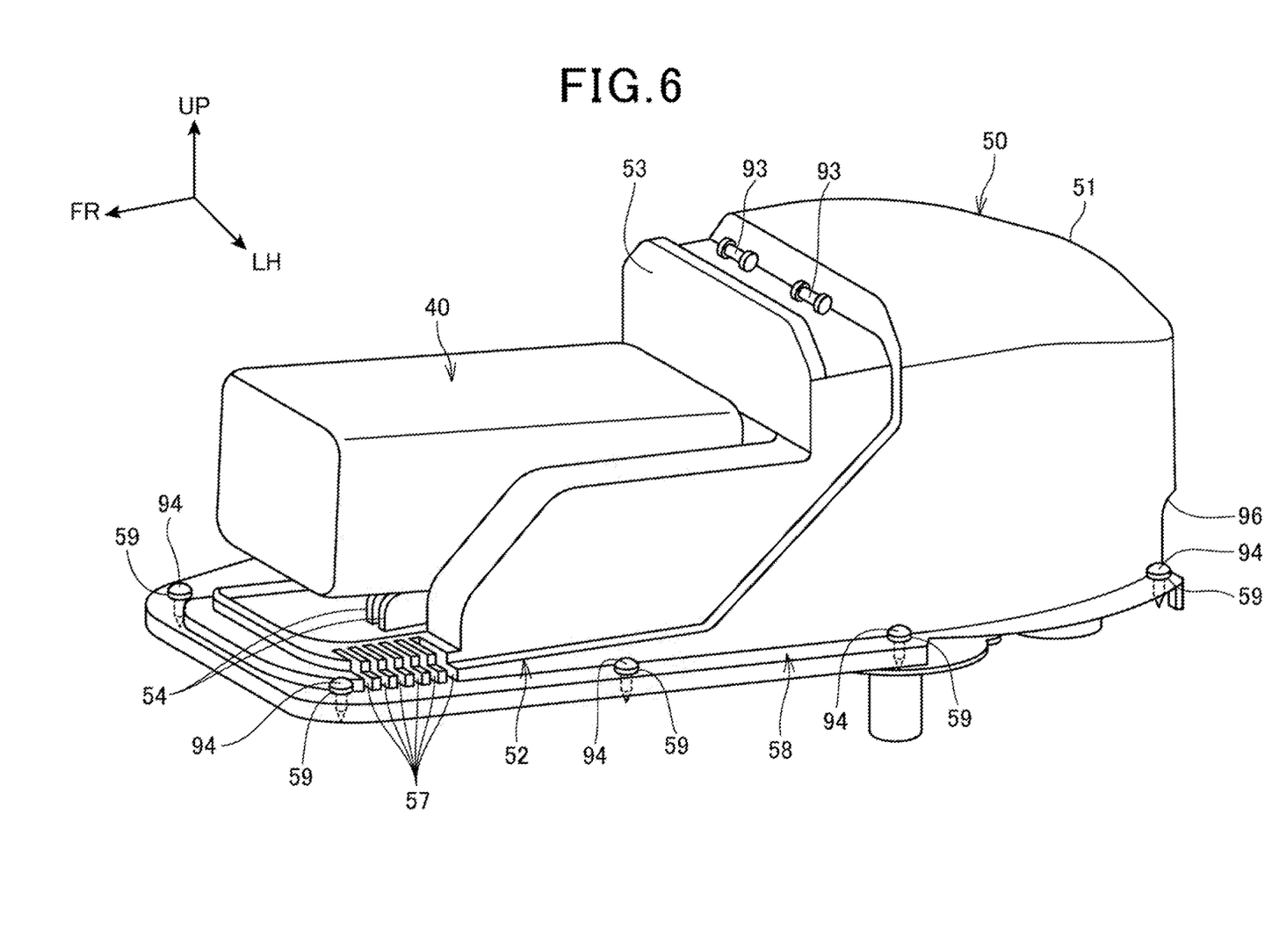
FIG. 6 is a perspective view that illustrates the power unit with a battery cover detached.
Figure 7:
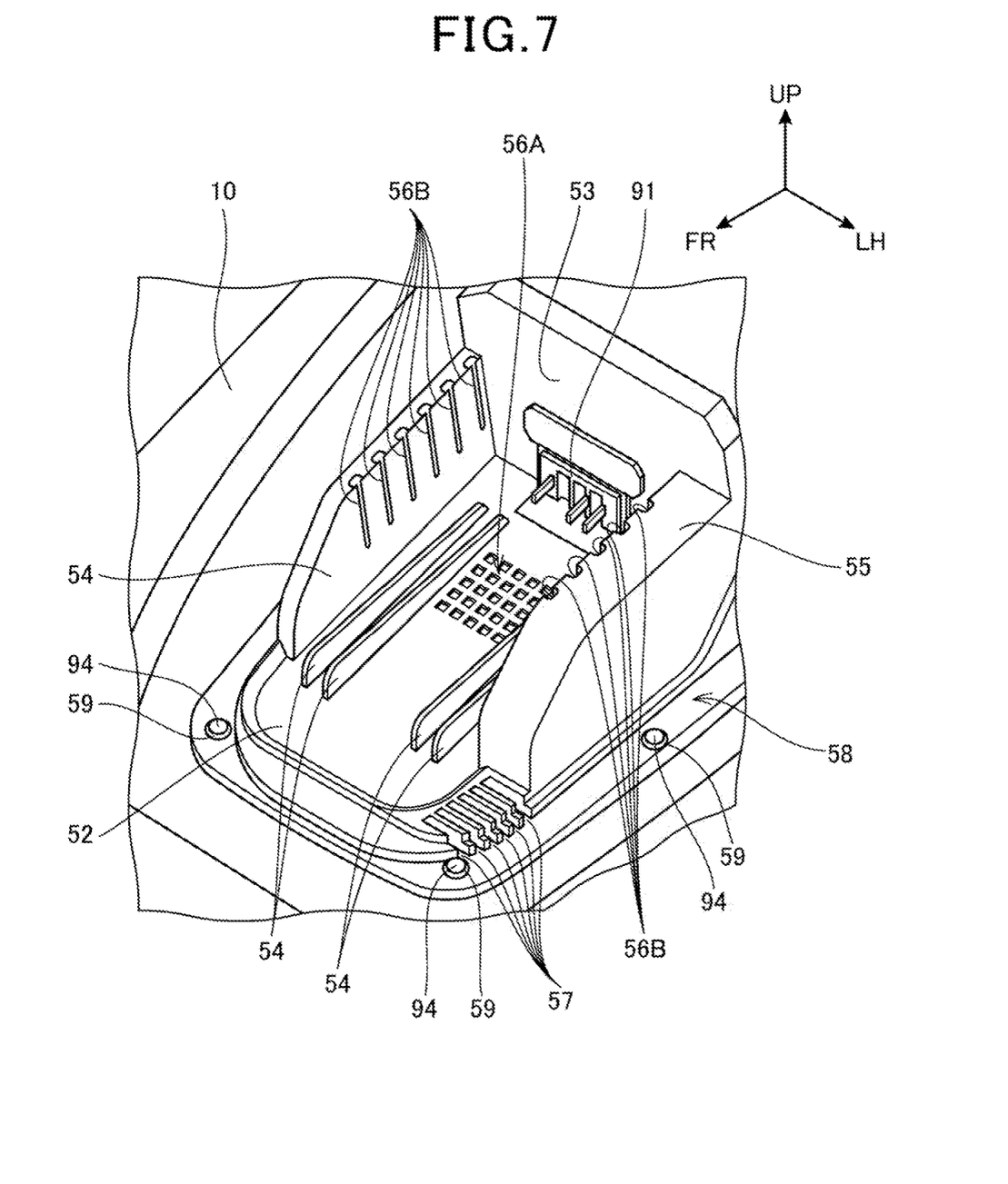
FIG. 7 is a perspective view of a flat plate portion.

FIG. 6 is a perspective view that illustrates the power unit 17 with a battery cover 60 detached, and FIG. 7 is a perspective view of the flat plate portion 52.

As illustrated in FIG. 6 and FIG. 7, the flat plate portion 52 is arranged on a front side of the accommodation portion 51 in the front-rear direction of the work machine 1. A partition wall 53 is provided on a front side in a side surface of the accommodation portion 51, and the flat plate portion 52 is provided at a lower end of the partition wall 53. The flat plate portion 52 is formed such that an upper surface is inclined downward from the accommodation portion 51 side toward the front side of the work machine 1.

Plural ribs 54 extending along the front-rear direction of the work machine 1 are formed to protrude on the upper surface of the flat plate portion 52. Each of upper sides of the ribs 54 is formed to be generally horizontal. Thus, each of the ribs 54 protrudes higher from the upper surface of the flat plate portion 52 toward the front side of the work machine 1. A bottom surface of the battery 40 arranged on the flat plate portion 52 is supported by the upper sides of the ribs 54.

A terminal block 91 with which terminals of the battery 40 are electrically connected is provided at a center of the lower end of the partition wall 53, and the battery 40 and the motor 30 are electrically connected together by the terminal block 91.

A pair of side walls 55 are provided on the upper surface of the flat plate portion 52. The pair of side walls 55 respectively cover portions of both side surface of the placed battery 40, the side surfaces positioned in the width direction of the battery 40.

The flat plate portion 52 is provided with plural bottom surface ventilation ports 56A for causing the upper surface to communicate with a lower surface of the flat plate portion 52, that is, an outer side to communicate with an inner side of the motor case 50. Each of the bottom surface ventilation ports 56A is provided in a part of the flat plate portion 52 which is adjacent to the partition wall 53 side.

Similarly, each of the side walls 55 is provided with plural side surface ventilation ports 56B for causing the outer side to communicate with the inner side of the motor case 50. Each of the side surface ventilation ports 56B is formed into a slit shape extending in the up-down direction and is continuous with a portion below the flat plate portion 52 via a communication pipe provided on an inside of the side wall 55.

Plural groove portions 57 formed by being notched downward are provided in predetermined parts on a front side in a periphery of the flat plate portion 52. Each of the groove portion 57 is formed to extend from an outer periphery of the flat plate portion 52 toward an inner side of the flat plate portion 52.

On a lower surface side of the flat plate portion 52, a pair of insertion portions 92 in which the second case fixing portions 25 are inserted are provided to protrude downward. The pair of insertion portions 92 are arranged in positions between which the terminal block 91 is interposed along the width direction of the work machine 1, and each of the pair of insertion portions 92 has a recessed shape recessed downward.

A case outer peripheral portion 58 extending outward with a predetermined width throughout a whole circumference is provided at a lower end of the motor case 50.

The case outer peripheral portion 58 and the first case fixing portion 23 of the housing 10 are formed into generally the same shape in a planar view. A screw hole 59 is provided in each part of the case outer peripheral portion 58 which corresponds to the case fastening portion 24 of the first case fixing portion 23.

The case outer peripheral portion 58 of the motor case 50 is placed on an upper end of the first case fixing portion 23. The screw member 94 is inserted through and fastened to each of the screw holes 59 and each of the case fastening portions 24 in a state where the pair of insertion portions 92 are respectively inserted in the second case fixing portions 25, and the motor case 50 is thereby fixed to the housing 10.

In the motor case 50 fixed in such a manner, as illustrated in FIG. 4, a space V is provided between the flat plate portion 52 and the upper surface of the housing 10.

The battery 40 of this embodiment has a rectangular parallelepiped shape and is housed in the flat plate portion 52 such that the longitudinal direction goes along the front-rear direction of the work machine 1.

The battery 40 and the flat plate portion 52 are covered with the battery cover 60 formed of a resin.

In a closed state, the battery cover 60 covers a portion from an upper end of the partition wall 53 to a front end of a peripheral portion of the flat plate portion 52 in the front-rear direction of the work machine 1 and covers the pair of side walls 55 in the width direction of the work machine 1. A periphery of the battery cover 60 contacts with the periphery of the flat plate portion 52 and a whole periphery of a front surface of the accommodation portion 51. A sealing material is provided to the periphery of the battery cover 60 so as to tightly contact with the periphery of the flat plate portion 52 and a periphery of the partition wall 53 when the battery cover 60 is in the closed state. Accordingly, the battery 40 and the flat plate portion 52 are shielded from trash, dust, and so forth on the outside.

The battery cover 60 is attached to the motor case 50 by hinges 93 provided around the upper end of the partition wall 53 on the upper surface of the accommodation portion 51, and the battery cover 60 is provided to be openable and closable about the hinges 93 as pivots.

The worker exposes the battery 40 by opening the battery cover 60 and replaces the battery 40. As described above, the battery 40 is partitioned from the motor 30 and the control device 80 by the motor case 50. Thus, even in a case where the battery cover 60 is opened, the motor 30 and the control device 80 are not exposed to the outside, and entry of trash and dust from the outside is inhibited.

The plural groove portions 57 are provided in predetermined parts in the periphery of the flat plate portion 52. Thus, an inside of the battery cover 60 may communicate with an outside even if the battery cover 60 is in the closed state.

Figure 8:
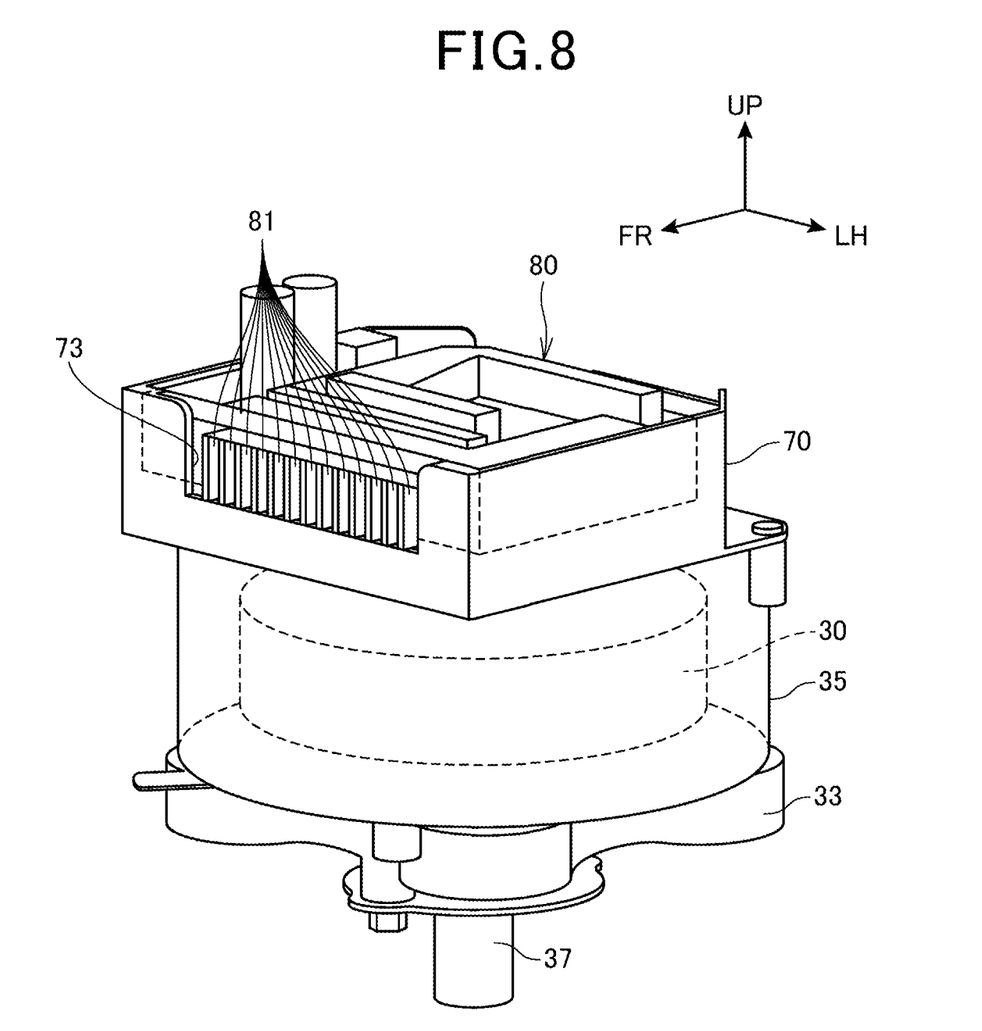
FIG. 8 is a perspective view that illustrates a motor, an air introduction member, and a control device.
Figure 9:
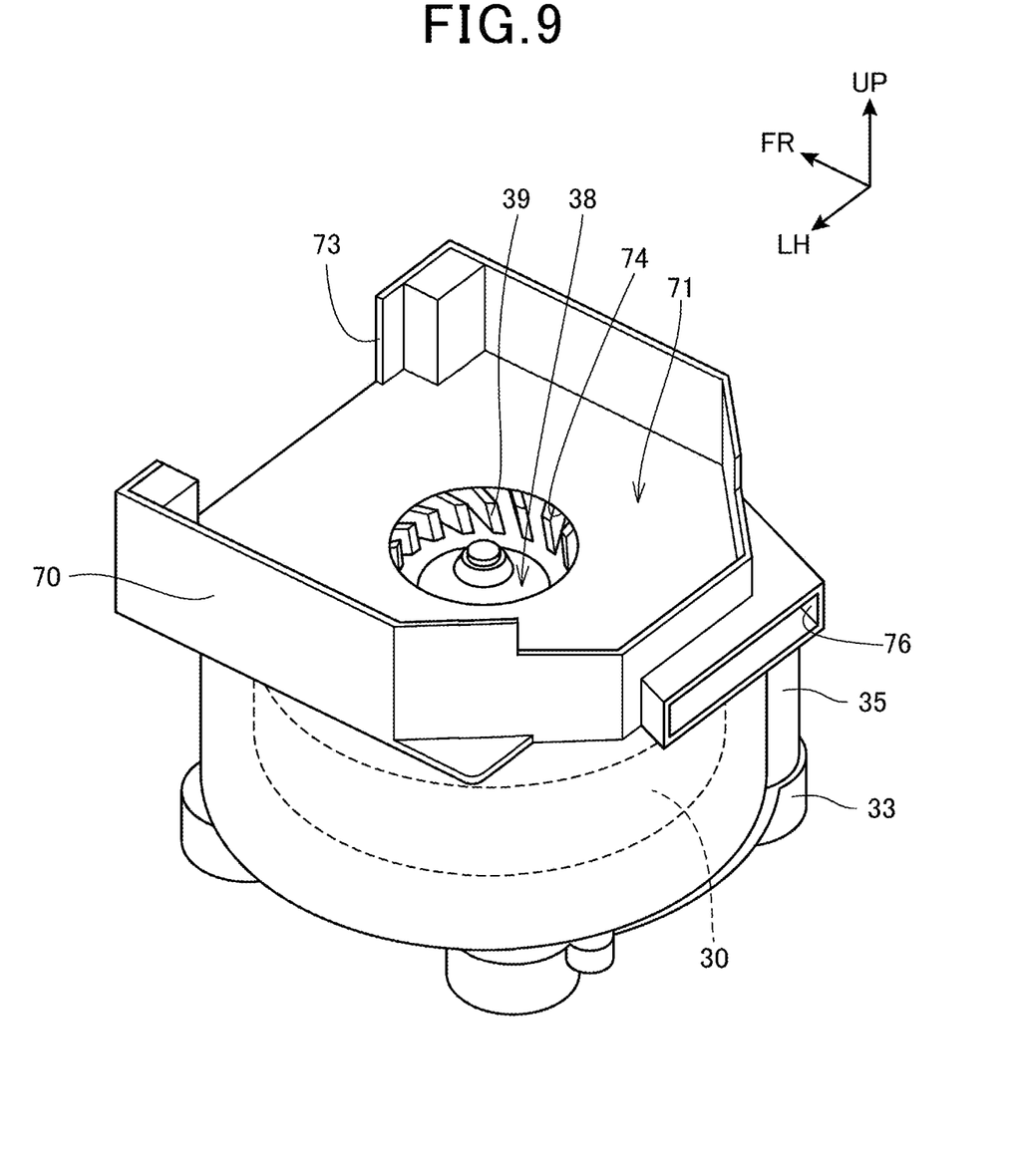
FIG. 9 is a perspective view of the air introduction member as seen from the rear, which is placed on the motor.

FIG. 8 is a perspective view that illustrates the motor 30, the air introduction member 70, and the control device 80, and FIG. 9 is a perspective view of the air introduction member 70 as seen from the rear, which is placed on the motor 30. Note that in FIG. 9, the control device 80 is omitted.

Next, an inside of the accommodation portion 51 will be described in detail.

As illustrated in FIG. 8 and FIG. 9, on the inside of the accommodation portion 51, the air introduction member 70 having a pentagonal frame shape in a top view is placed above the motor 30. A partition plate 71 is provided in an intermediate area of the air introduction member 70 in the up-down direction.

A communication hole 74 is provided at a center of the partition plate 71. The communication hole 74 is provided in a part positioned above the vanes 39 on an upper surface side of the cooling fan 38 and causes a space on an upper side to communicate with a space on a lower side of the partition plate 71 provided to the air introduction member 70. The space on the lower side of the partition plate 71 covers the vanes 39 on the upper surface side of the cooling fan 38.

On the upper side of the partition plate 71 of the air introduction member 70, a surface positioned on a front side in the front-rear direction of the work machine 1 is notched with a predetermined width, and the suction port 73 is thereby formed.

On the lower side of the partition plate 71 of the air introduction member 70, in a surface positioned on a rear side in the front-rear direction of the work machine 1, an exhaust port 76 opening rearward is provided.

In such a manner, the air introduction member 70 is provided with an air path through which air flows from the suction port 73 to the exhaust port 76 by rotation of the cooling fan 38. The upper side of the partition plate 71 forms an upper stage air path 72 of the air introduction member 70, and the lower side forms a lower stage air path 75 of the air introduction member 70.

The control device 80 is arranged on an upper surface of the partition plate 71 of the air introduction member 70. The control device 80 is a member that includes an electric circuit which controls electric power supply performed from the battery 40 to the motor 30. The control device 80 turns on or off the power supply to the motor 30 in accordance with the operation of the operation unit 15 provided to the operation handle 14 and thereby rotates or stops the motor 30. The control device 80 changes the number of rotations of the motor 30 in accordance with the operation of the operation unit 15 by the worker.

On a lower surface of the control device 80, plural heat dissipation fins 81 protruding downward are aligned so as to extend in the front-rear direction of the work machine 1. The heat dissipation fins 81 are placed on the upper surface of the partition plate 71, and the control device 80 is thereby housed in the air introduction member 70. One end portion of each of the heat dissipation fins 81 is exposed from the suction port 73 of the air introduction member 70.

In such a manner, the partition plate 71 is provided to the air introduction member 70, the control device 80 and the motor 30 may thereby be arranged at a predetermined interval, and heat transmission from the motor 30 to the control device 80 may be inhibited.

When the cooling fan 38 is rotated and driven, the air taken from the outside of the work machine 1 into the inside of the battery cover 60 is taken into an inside of the motor case 50 through the bottom surface ventilation ports 56A and the side surface ventilation ports 56B. The bottom surface ventilation ports 56A and the side surface ventilation ports 56B are positioned below the suction port 73 of the air introduction member 70, and the air taken in moves upward.

The air taken into the inside of the motor case 50 flows into the air introduction member 70, and the control device 80 is thereby cooled. This air is exhausted from the air introduction member 70 and thereafter released from the motor case 50.

A bag-shaped mown lawn grass storage body 16 which stores lawn grass mown by the blade 11 is provided in a rear portion of the housing 10. The lawn grass mown by the blade 11 is stored in the mown lawn grass storage body 16 while passing through a predetermined path in the housing 10. Note that the mown lawn grass storage body 16 of this embodiment is detachably provided, and the work machine 1 may be used without the mown lawn grass storage body 16 mounted.

Next, an action of this embodiment will be described.

The worker walks while gripping the operation handle 14 and pushing the work machine 1 forward, the blade 11 driven by the motor 30 rotates, and the work machine 1 thereby mows lawn grass on a lawn ground.

In the work machine 1 of this embodiment, the motor 30 and the battery 40 are arranged side-by-side on the upper surface of the housing 10. The battery 40 is arranged in front of the motor 30 and extends to a position adjacent to a front end of the housing 10.

Here, the cooling fan 38 rotates in response to driving of the motor 30. Accordingly, outside air introduced from an outside of the power unit 17 passes through an air path on the inside of the power unit 17 as cooling air and cools members on the inside of the power unit 17.

Specifically, the vanes 39 on the upper surface side of the cooling fan 38 rotate, and air is taken into the inside of the battery cover 60 via each of the groove portions 57. Note that a configuration is possible in which no sealing material is provided to the battery cover 60 and air can be sucked through a whole gap between the battery cover 60 and the motor case 50.

The air taken in is sucked into the inside of the motor case 50 through each of the bottom surface ventilation ports 56A and each of the side surface ventilation ports 56B. As described above, the flat plate portion 52 is inclined toward the front of the work machine 1. Thus, the trash and dust remaining on the inside of the battery cover 60 among trash and dust taken into the inside of the battery cover 60 together with air slide on the upper surface of the flat plate portion 52 and move to a portion of the flat plate portion 52 on a front side of the work machine 1, that is, a part away from the bottom surface ventilation ports 56A.

The air sucked into the inside of the motor case 50 passes the space V positioned below the flat plate portion 52 and flows to an upper portion of the accommodation portion 51 while passing through a portion between the partition wall 53 and the motor cover 35. That is, the space V serves as an air path through which the air sucked into the inside of the motor case 50 flows.

Here, because air flows from a lower portion to an upper portion of the work machine 1, trash and dust sucked into the inside of the motor case 50 remain in the space V by the gravity. Air flows along a side surface of the motor cover 35, and the motor 30 is thereby cooled.

The air that reaches the upper portion of the accommodation portion 51 is sucked into the suction port 73 of the air introduction member 70. The sucked air flows through the upper stage air path 72. Specifically, the sucked air flows among the heat dissipation fins 81 along the longitudinal direction of the heat dissipation fins 81, and the control device 80 is thereby cooled. In such a manner, the partition plate 71 is provided to the air introduction member 70, air thereby efficiently flows among the heat dissipation fins 81, the flow rate of air may be raised, and cooling efficiency of the control device 80 may be enhanced.

The air that flows among the heat dissipation fins 81 is caused to flow from the communication hole 74 to the lower stage air path 75. The air that flows to the lower stage air path 75 is discharged from the exhaust port 76 to an outside of the air introduction member 70. As described above, the lower stage air path 75 is demarcated from the motor 30 by the cooling fan 38 and the motor cover 35. Accordingly, even in a case where trash and dust reach the lower stage air path 75 together with air, those trash and dust may be inhibited from reaching the motor 30.

The air discharged to the outside of the air introduction member 70 is discharged from the discharge port 96 to an outside of the motor case 50.

In the above-described air paths on the inside of the power unit 17, the suction port 73 is arranged above each of the bottom surface ventilation ports 56A, each of the side surface ventilation ports 56B, the motor 30, and so forth. The air paths on the inside of the power unit 17 are formed into a so-called labyrinth structure. Thus, even in a case where trash, dust, and so forth enter from the outside of the motor case 50, the trash, dust, and so forth may be inhibited from reaching the control device 80 and the motor 30. In the air paths on the inside of the power unit 17, cooling is performed in order from the battery 40 at a relatively low temperature to the control device 80 at a relatively high temperature, it is thus possible to efficiently cool members on the inside of the power unit 17.

Similarly, in the above-described air paths on the inside of the power unit 17, the exhaust port 76 is arranged in a position higher than the motor 30, the battery 40, and so forth. Thus, even in a case where the motor 30 is in a low rotation state and the rotation speed of the cooling fan 38 is slow, heat of the motor 30, the battery 40, and so forth may be discharged through the exhaust port 76 by natural convection in the power unit 17.

In addition, the exhaust port 76 is arranged above the blade 11 across the motor 30, the cooling fan 38, and so forth in the up-down direction of the work machine 1. Accordingly, even in a case where lawn grass or the like mown by the blade 11 is scattered, mown lawn grass may be inhibited from entering the air paths on the inside of the power unit 17 through the exhaust port 76.

The above-described embodiment provides the following effects.

The work machine 1 of this embodiment includes the housing 10, the motor 30 fixed to the upper surface of the housing 10, the battery 40 connected with the motor 30, and the blade 11 driven by the motor 30. The battery 40 is fixed to the upper surface of the housing 10 via the motor case 50 that covers the motor 30, and the control device 80 that controls driving of the motor 30 and the air introduction member 70 that causes air to flow and thereby cools the control device 80 are provided on the inside of the motor case 50. The motor case 50 is provided with the plural bottom surface ventilation ports 56A and the plural side surface ventilation ports 56B. Both of the ventilation ports 56A and 56B cause air to flow into the inside of the motor case 50. A configuration is made in which the plural bottom surface ventilation ports 56A and the plural side surface ventilation ports 56B are provided in positions lower than the air introduction member 70 and the control device 80.

Accordingly, the air sucked into the inside of the motor case 50 flows from the lower portion to the upper portion of the work machine 1, and trash and dust sucked into the inside of the motor case 50 together with air remain in a lower portion of the motor case 50 by the gravity. Thus, even in a case where trash, dust, and so forth enter from the outside of the motor case 50, the trash, dust, and so forth may be inhibited from reaching the control device 80 and the motor 30.

In this embodiment, the partition plate 71 is provided to the air introduction member 70, and the suction port 73 that sucks air flowing into the inside of the motor case 50 is provided above the partition plate 71. A configuration is made in which the exhaust port 76 for exhausting air drawn in by the cooling fan 38 is provided below the partition plate 71. Accordingly, air efficiently flows among the heat dissipation fins 81, the flow rate of air may be raised, and the cooling efficiency of the control device 80 may be enhanced.

In the configuration of this embodiment, the exhaust port 76 is provided in a position higher than the blade 11. Accordingly, even in a case where lawn grass or the like mown by the blade 11 is scattered, mown lawn grass may be inhibited from entering the air paths on the inside of the power unit 17 through the exhaust port 76 of the air introduction member 70.

In this embodiment, the control device 80 is placed on the air introduction member 70, the air introduction member 70 is provided above the motor 30, and the cooling fan 38 that draws air into the air introduction member 70 is provided between the motor 30 and the air introduction member 70. The cooling fan 38 is configured to close the upper surface of the motor 30. Accordingly, even in a case where trash and dust reach the lower stage air path 75 of the air introduction member 70 together with air, those trash and dust may be inhibited from reaching the motor 30.

In this embodiment, a configuration is made in which the cooling fan 38 is formed into a disk shape and the vanes 39 are provided to both of the surfaces of the cooling fan 38 which are the surface arranged on the motor 30 side and the surface arranged on the air introduction member 70 side. Accordingly, the cooling fan 38 is rotated and driven while closing the upper surface of the motor 30 and may thereby cool the motor 30 below the cooling fan 38 and the battery 40 and the control device 80 above the cooling fan 38.

In this embodiment, a configuration is made in which the battery 40 is fixed to the upper surface of the housing 10 via the motor case 50 that covers the motor 30 and the bottom surface ventilation ports 56A are provided below the battery 40. Accordingly, the air sucked into the inside of the motor case 50 flows through a portion below the battery 40 and thereafter flows toward the air introduction member 70 positioned in an upper portion on the inside of the motor case 50. Accordingly, trash and dust sucked into the inside of the motor case 50 together with air may be caused to remain in the lower portion of the motor case 50 by the gravity.

A configuration is made in which the space V is provided below the bottom surface ventilation ports 56A and the space V serves as the air path through which the air flowing into the inside of the motor case 50 flows. Accordingly, the air sucked into the inside of the motor case 50 flows through the space V and thereafter flows toward the air introduction member 70 positioned above the space V. Thus, trash and dust sucked into the inside of the motor case 50 together with air may be caused to remain in the space V by the gravity.

The above-described embodiment represents one aspect of the present invention as an example, and any modification and application are possible without departing from the scope of the gist of the present invention.

For example, in the above-described embodiment, the flat plate portion 52 is provided on the front side of the accommodation portion 51 in the front-rear direction of the work machine 1, and the battery 40 is arranged on the flat plate portion 52. However, arrangement is not limited to this, but if the housing 10 has a sufficient space, the flat plate portion 52 and the battery 40 may be arranged in the rear of or on a lateral side of the accommodation portion 51.

For example, the work machine 1 may be a walking autonomous traveling work machine that includes the motor 30 as a motive power source for travel for driving the pair of front wheels 12 or the pair of rear wheels 13, the walking autonomous traveling work machine with which the worker walks while driving the work machine 1 autonomously traveling by the motor 30.

For example, the work machine 1 may be an autonomous traveling work machine that mows lawn grass while performing unmanned autonomous travel.

For example, the work machine 1 may include a so-called hybrid system that is equipped with an engine (internal combustion engine), charges the battery 40 by driving the engine, and drives the motor 30 by charged electric power.

REFERENCE SIGNS LIST

1 work machine
10 housing
11 blade (working unit)
17 power unit
21 insert-through hole
30 motor
38 cooling fan
39 vane
40 battery
50 motor case (case)
51 accommodation portion
52 flat plate portion
53 partition wall
56A bottom surface ventilation port (ventilation port)
56B side surface ventilation port (ventilation port)
57 groove portion
60 battery cover
70 air introduction member
71 partition plate
72 upper stage air path
73 suction port
74 communication hole
75 lower stage air path
76 exhaust port
80 control device
81 heat dissipation fin
V space (air path)

What is claimed is:

1. A work machine comprising:
a housing; a motor positioned on an upper surface of the housing; a battery connected with the motor; a working unit to be driven by the motor; and a case covering the motor, wherein
an air introduction member that cools a control device by causing air to flow is provided on an inside of the case,
a ventilation port that causes air to flow into the inside of the case is provided to the case,
the ventilation port is provided in a position lower than the air introduction member and the control device,
a partition plate is provided to the air introduction member,
a suction port that sucks air flowing into the inside of the case is provided above the partition plate, and
an exhaust port that exhausts air drawn in by a cooling fan is provided below the partition plate.

2. The work machine according to claim 1, wherein the exhaust port is provided in a position higher than the working unit.

3. The work machine according to claim 1, wherein:
the control device is placed on the air introduction member,
the air introduction member is provided above the motor,
the cooling fan draws air into the air introduction member and is provided between the motor and the air introduction member, and
the cooling fan demarcates an upper surface of the motor.

4. The work machine according to claim 3, wherein a vane arranged on a side of the motor and a vane arranged on a side of the air introduction member are provided to the cooling fan.

5. The work machine according to claim 1, wherein:
the battery is fixed to the upper surface of the housing via the case covering the motor, and
the ventilation port is provided below the battery.

6. The work machine according to claim 1, wherein an air path is provided below the ventilation port, and air flowing into the inside of the case flows through the air path.

7. The work machine according to claim 1, wherein the working unit is a blade that mows lawn grass below the housing.

* * * * *